United States Patent Office 3,743,623
Patented July 3, 1973

3,743,623
THIOSUCCINIC ACID HINDERED PHENOLIC ESTER POLYMER STABILIZERS
Eduard K. Kleiner, Dobbs Ferry, N.Y., assignor to Ciba-Geigy Corporation, Ardsley, N.Y.
No Drawing. Original application July 5, 1968, Ser. No. 742,701, now Patent No. 3,637,809, dated Jan. 25, 1972. Divided and this application Aug. 20, 1970, Ser. No. 65,694
Int. Cl. C08f 45/58; C08g 51/58
U.S. Cl. 260—45.85 S
9 Claims

ABSTRACT OF THE DISCLOSURE

Organic materials, particularly synthetic polymers such as polypropylene are protected against oxidation in air, thermal degradation or deterioration by including, in such substances, a stabilizing amount of antioxidant. The antioxidant is obtained by reacting (a) an $\alpha,\beta$ - unsaturated ester of a hindered hydroquinone and (b) hydrogen sulfide or a mercaptan. The ensuing compound is a hindered phenolic ester of a hydrocarbyl thio succinic acid.

---

This application is a divisional of application Ser. No. 742,701, filed July 5, 1968, now U.S. Pat. No. 3,637,809.

DETAILED DISCLOSURE

The present invention is concerned with novel compounds which are useful as antioxidants for organic materials and particularly, as antioxidants for synthetic polymers such as, for example, polypropylene, polyethylene, polystyrene, polyvinyl chloride, nylon and other polyamides, polyesters, cellulosics, polyacetals, polyurethanes, petroleum and wood resins, mineral oils, animal and vegetable fats, waxes, rubbers such as styrene-butadiene rubber (SBR), acrylonitrile-butadiene-styrene rubber (ABS), olefin-copolymers, ethylene - vinyl - acetate copolymers, polycarbonates, polyacrylonitrile, poly (4-methyl pentene-1) polymers, polyoxymethylenes, and the like. The present invention also relates to a novel procedure for preparing the aforesaid novel antioxidants and to stabilized compositions containing said novel antioxidants.

The prevention of oxidation of various organic materials is obviously of primary industrial concern and, therefore, antioxidants are used in or added to a wide variety of commercial products such as synthetic polymers of the type indicated supra, oils, plastic materials, etc., which are normally subject to oxidative deterioration.

The novel antioxidants of the present invention are represented by the folowing formulae:

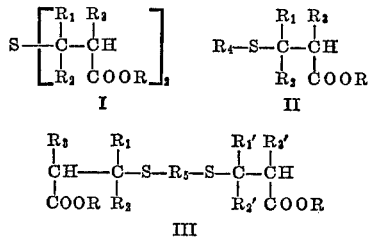

wherein R is

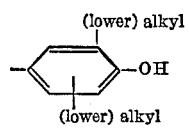

$R_1$, $R_2$, $R_3$, $R_1'$, $R_2'$, $R_3'$ are each —H, lower alkyl, phenyl, aralkyl or —$C_mH_{2m}COOR$, where $m$ is 0 to 6 (preferably 0 or 1) $R_4$ is —$C_nH_{2n+1}$ where $n$ is 1 to 24 (preferably 8 to 18 or mixtures thereof), cyclohexyl, phenyl, aralkyl, or —$(CH_2)_y$—COO-alkyl, -phenyl or -aralkyl, where $y$ is 1 or 2. $R_5$ is —$C_nH_{2n}$— where $n$ is 2 to 12, —$CH_2CH_2OCH_2CH_2$—, —$CH_2CH_2$—S—$CH_2CH_2$—

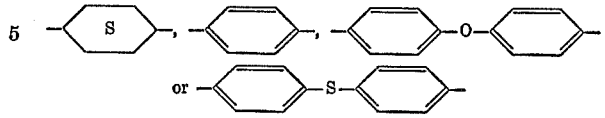

with the proviso that in compounds of Formulae I and II supra, at least one of the substituents $R_1$, $R_2$ or $R_3$ must be —$C_mH_{2m}COOR$ and in compounds of Formula III supra, at least one of the substituents $R_1$, $R_2$, $R_3$, $R_1'$, $R_2'$ or $R_3'$ must be —$C_mH_{2m}COOR$, where $R_1$, $R_2$, $R_3$, $R_1'$, $R_2'$, $R_3'$, R and $m$ are as defined above.

As used herein, alkyl is meant to cover groups containing from 1 to 24 carbon atoms; lower alkyl covers groups containing 1 to 6 carbon atoms, alkoxy covers groups containing from 1 to 4 carbon atoms. Further, the phenyl group referred to above may be substituted by a halogen (chlorine or bromine), alkyl, alkoxy, hydroxyl, alkylthio or a carboalkoxy group. Aralkyl is meant to cover a group such as benzyl which may be substituted by a halogen (chlorine or bromine), alkyl, alkoxy, hydroxy, alkylthio or a carboalkoxy group.

The novel antioxidants of the present invention are addition products of (a) and $\alpha,\beta$-unsaturated ester of a hindered hydroquinone of the formula

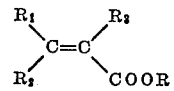

and (b) hydrogen sulfide or a mercaptan of the formula $R_4$—SH or HS—$R_5$—SH, wherein R, $R_1$, $R_2$, $R_3$, $R_4$ and $R_5$ are as described above.

The addition reaction involving hydrogen sulfide or a mercaptan compound with the $\alpha,\beta$-unsaturated ester is effected in the presence of catalytic amounts (0.01 to 2%) of a base at temperatures varying from room temperature up to an elevated temperature. The preferred bases are alkoxides such as sodium or potassium methoxide or sodium or potassium ethoxide, piperidine, pyridine or benzyltrimethylammonium hydroxide. It is also possible to catalyze the addition reaction by the use of a free-radical initiator such as an azo compound and particularly an azonitrile compound or an aliphatic peroxide of the type described in applicant's copending application entitled Polymeric Antioxidants, Ser. No. 738,770, filed June 21, 1968, now abandoned, and its continuing application Ser. No. 168,397, filed Aug. 2, 1971.

Specific procedures used for preparing the desired antioxidants will vary depending upon either the product desired or the hydrogen sulfide or the mercaptan which is used in the addition reaction. One procedure which is used in preparing antioxidants represented by Formulae II and III (synmmetrical only) supra, i.e., method (a), involves dissolving equimolar amounts of the $\alpha,\beta$-unsaturated ester and mercaptan in a solvent such as benzene or chloroform together with 1% by weight (based on the ester and mercaptan) of a 35% (by weight) solution of benzyltrimethylammonium hydroxide in methanol. The reaction is exothermic and cooling may be necessary. After standing several hours at room temperature (or alternatively heating in reaction mixture to a temperature between 60 and 80° C. for a period of about 20 to 60 minutes), the base is neutralized with an equivalent of acetic acid. After evaporation of the solvent, the product is either distilled or crystallized. The yields in all cases are excellent that is, in excess of 90%.

A second reaction procedure which can be used to prepare unsymmetrical antioxidants represented by Formula III supra and exemplified by compounds F and C supra, involves adding, to a solution of 5–10 moles of a dimercaptan of the formula HS—R$_5$—SH, as indicated supra, in chloroform and 1% benzyltrimethylammonium hydroxide (in a 35% solution in methanol) a solution of 1 mole of the α,β-unsaturated ester of a hindered hydroquinone in chloroform. After standing for several hours at room temperature, the base is neutralized with acetic acid. The solvent and excess dimercaptan are distilled off and the crude intermediate is recrystallized. The addition of the second α,β-unsaturated ester of a hindered hydroquinone is carried out as described under method (a).

The procedures for preparing the desired products of the present invention referred to as methods (a) and (b) supra are the preferred methods for synthesizing the novel antioxidants. However, it is also possible to add first the mercaptan or hydrogen sulfide to the α,β-unsaturated acid followed by esterifying the intermediate with the hindered hydroquinone. This procedure is preferred for preparing antioxidants of the formula

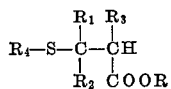

where R$_4$ is —(CH$_2$)$_y$—COOR, where $y$ is 1 or 2 and R, R$_1$ R$_2$ and R$_3$ are as defined above.

This procedure is illustrated by the following equations:

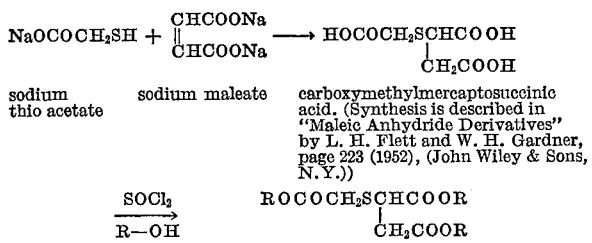

When hydrogen sulfide is included in the addition reaction to give antioxidants represented by Formula I supra, hydrogen sulfide is bubbled through a solution of the α,β-unsaturated ester and the 0.1 to 2% trimethylbenzylammonium hydroxide or sodium methoxide solution (based on the α,β-unsaturated ester) in chloroform at temperatures between 30° and 60° C. The reaction is exothermic and is stopped when so more hydrogen sulfide is absorbed. The work-up procedure is similar to that described in the method (a) above.

Illustrative α,β-unsaturated esters used in preparing the desired antioxidants of the present invention as indicated above, are represented by the following formula:

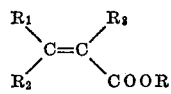

wherein R is

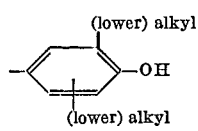

and R$_1$, R$_2$ and R$_3$ are as defined above.

Examples of such esters are:

| Esters of— | R$_1$ | R$_2$ | R$_3$ |
|---|---|---|---|
| Acrylic acid | —H | —H | —H |
| Methacrylic acid | —H | —H | —CH$_3$ |
| Crotonic acid | —CH$_3$ | —H | —H |
| Cinnamic acid | —C$_6$H$_5$ | —H | —H |
| Fumaric acid | —COOR | —H | —H |
| Maleic acid | —H | —COOR | —H |
| Mesaconic acid | —COOR | —H | —CH$_3$ |
| Citraconic acid | —H | —COOR | —CH$_3$ |
| Itaconic acid | —H | —H | —CH$_2$COOR |
| Aconitic acid | —COOR | —H | —CH$_2$COOR |

The preferred α,β-unsaturated esters are esters of fumaric and itaconic acid.

Preferred mercaptan compounds used in preparing the antioxidants of the present invention are alkyl mercaptans containing from 8 to 18 carbon atoms; alkanedithiols containing from 2 to 10 carbon atoms; 2,2'-oxydiethanethiol, 2,2'-thiodiethanethiol, and the like.

Some of the preferred starting α,β-unsaturated ester compounds used in preparing the antioxidant compounds of the present invention are as follows:

(I) 3,5-di-tert-butyl-4-hydroxyphenyl acrylate $$CH_2=CH—COO—R_0$$

(II) Bis(3,5-di-tert-butyl-4-hydroxyphenyl) fumarate

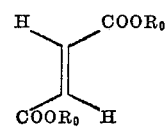

(III) Bis(3,5-di-tert-butyl-4-hydroxyphenyl) itaconate

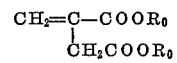

wherein R$_0$ is

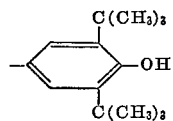

The aforesaid α,β-unsaturated esters (identified above as compounds I, II and III) are reacted with the following mercaptan compounds:

| Compound: | Structural formula |
|---|---|
| (IV) n-Octyl mercaptan | C$_8$H$_{17}$SH |
| (V) n-Dodecyl mercaptan | C$_{12}$H$_{25}$SH |
| (VI) n-Octadecyl mercaptan | C$_{18}$H$_{37}$SH |
| (VII) 3-phenylpropyl mercaptan | C$_6$H$_5$(CH$_2$)$_3$SH |
| (VIII) 1,2-ethanedithiol | HSCH$_2$CH$_2$SH |
| (IX) 1,4-butanedithiol | HS(CH$_2$)$_4$SH |
| (X) 1,8-octanedithiol | HS(CH$_2$)$_8$SH |
| (XI) 2,2'-oxydiethanethiol | (HSCH$_2$CH$_2$)$_2$O |
| (XII) 2,2'-thiodiethanethiol | (HSCH$_2$CH$_2$)$_2$S |

In the following table, Table I, the addition of the mercaptan to the α,β-unsaturated ester is carried out by the procedure set out according to method (a) supra. The purity of all antioxidants was checked either by TLC (thin layer chromatography) or VPC (vapor phase chromatography) and the structure was confirmed by IR (infrared) and NMR (nuclear magnetic resonance). Elemental analysis, melting and boiling points are listed below in Table I. The antioxidant products are identified below Table I, by structural formula as well as by the actual name of the product.

In the above formulae, $R_0$ is as defined supra.

The oxidation of most polymers is so slow at ambient temperatures, even in the absence of antioxidants, that testing of the effects of antioxidants must necessarily be conducted at high temperatures in order to yield results within a convenient period of time. The tests conducted on the materials listed in the following table were conducted in a tubular oven with an airflow of 400′ per minute at an oven temperature of 150° C. The oven ageing is set out in hours.

In preparing the sample for testing, unstabilized polypropylene powder is thoroughly blended with the indicated antioxidant. The blended material is thereafter milled on a two-roller mill at a temperature of 182° C. for six minutes after which time the stabilized polypropylene is sheeted from the mill and allowed to cool. The milled polypropylene sheet which has been stabilized is then cut into small pieces and pressed for seven minutes on a hydraulic press at 218° C. and 174 p.s.i. pressure. The resultant sheet of 25 mil thickness is then tested for resistance to accelerated ageing in the above described tubular oven.

TABLE II

Evaluation of novel antioxidants in polypropylene (25 mil), tubular oven, 150° C.

| Product | Hours to fail | |
|---|---|---|
| | 0.25% antioxidant | 0.1% antioxidant plus 0.3% DSTDP [1] |
| A | 1,100 | 1,370 |
| B | 1,125 | 1,315 |
| C | 945 | 1,070 |
| D | 1,430 | 1,770 |
| E | 1,820 | 2,100 |
| F | 1,000 | 1,500 |
| G | 820 | 1,480 |
| H | 660 | 1,340 |
| I | 430 | 1,000 |
| J | 840 | 1,460 |
| K | 520 | 1,000 |
| L | 780 | 1,590 |
| M | 780 | 1,590 |
| N | 820 | 1,440 |

[1] DSTDP is distearylthiodipropionate (a synergist for antioxidants)

Besides activity in the oven ageing test, the novel antioxidants of the present invention are characterized by excellent color values (no discoloration during the oven ageing test) and good gas fading properties.

The present antioxidants are useful in protecting synthetic polymers such as polypropylene against oxidation in air, thermal degration or deterioration by including in such substances, a stabilizing amount of the oxidant which will vary between about 0.05 and about 5% and preferably, from about 0.1 to about 0.5%. The antioxidant can be incorporated into the synthetic polymers using conventional procedures. For example, the antioxidants of the present invention are incorporated into the material to be stabilized by any suitable means such as by milling the antioxidant on hot or cold mill rolls, by mixing it in by the use of a Banbury mixer or other well-known devices of this nature or the antioxidant may be mixed with a polyoleifin material in the form of molding powder and incorporated during extrusion or prior to extrusion or during injection molding. The antioxidant may even be incorporated into a solution of the polyolefin material and the solution may then be employed for the formation of films, for wet or dry spinning of fibers, monofilament and the like.

The examples set out above are to be considered as illustrative of the present invention and are not to be considered as restrictive. It is therefore to be understood that the invention is not limited to the specific embodiments set out above except as defined in the appended claims.

What is claimed is:

1. A composition of matter stabilized against deterioration, said composition comprising an organic material normally subject to deterioration and a stabilizing amount of an ester having the formula

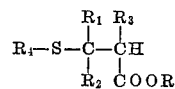

or

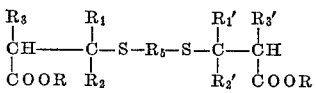

wherein

R is

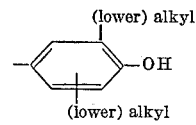

$R_1$, $R_2$ and $R_3$ are such that one group is a —COOR or —CH$_2$COOR moiety, the remaining groups being independently hydrogen, lower alkyl having up to 3 carbon atoms, phenyl or benzyl, $R_1'$, $R_2'$ and $R_3'$ are such that up to one group may be —COOR or —CH$_2$COOR moiety, the remaining groups being independently hydrogen, lower alkyl having up to 3 carbon atoms, phenyl or benzyl, $R_4$ is —C$_n$H$_{2n+1}$ where $n$ is 1 to 24, cyclohexyl, phenyl, phenyl, benzyl, —(CH$_2$)$_y$—COO—alkyl, where $y$ is 1 or 2 and the alkyl has 1 to 24 carbon atoms, $R_5$ is —C$_n$H$_{2n}$— wherein $n$ is 2 to 12,

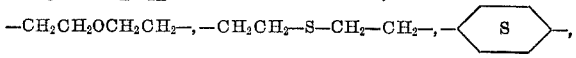

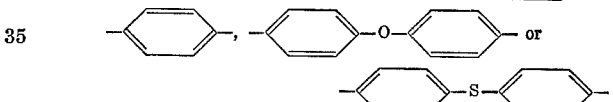

2. A composition of claim 1 wherein R is 3,5-di-t-butyl-4-hydroxyphenyl group.

3. A composition of claim 1 wherein the organic material is a polyolefin.

4. A composition of claim 1 wherein in the group —C$_n$H$_{2n+1}$ $n$ is 8 to 18.

5. A composition of claim 1 wherein the compound is bis(3,5-di-tert-butyl-4-hydroxyphenyl) 2-(n-dodecylthio)-succinate.

6. A composition of claim 1 wherein the compound is bis(3,5-di-tert-butyl-4-hydroxyphenyl) 3 - (n - octadecylthio)succinate.

7. A composition of claim 1 wherein the compound is bis(3,5-di-tert-butyl-4-hydroxyphenyl) 3 - (3,5-di-tert-butyl - 4 - hydroxyphenoxycarbonylethylthioethylthio)succinate.

8. A composition of claim 1 wherein the compound is bis(3,5-di-tert-butyl-hydroxyphenyl) 2-(3,5-di-tert-butyl-4 - hydroxyphenoxycarbonylethylthioethylthiomethyl)succinate.

9. A composition of claim 1 wherein the compound is tetrakis(3,5-di-tert-butyl-4-hydroxyphenyl) 2,2′-[thio-bis (ethylthio)]disuccinate.

References Cited

UNITED STATES PATENTS

| 3,294,836 | 12/1966 | Peterson et al. | 260—479 |
| 3,433,762 | 3/1969 | Kezerian et al. | 260—45.85 |
| 3,536,661 | 10/1970 | Hagemeyer et al. | 260—45.85 |
| 3,630,991 | 12/1971 | Schutze et al. | 260—45.85 |

DONALD E. CZAJA, Primary Examiner

V. P. HOKE, Assistant Examiner

U.S. Cl. X.R.

99—163; 106—181; 252—404, 57; 260—666.5, 810, 814

TABLE I.—PROPERTIES AND ANALYSIS OF NOVEL ANTIOXIDANTS

| Product | Appearance | Melting point (°C.) | Crystallized from— | Elemental analysis | | | Starting material |
|---|---|---|---|---|---|---|---|
| | | | | | Calc'd | Found | |
| A | White powder | 87–89 | Heptane | | | | II + IV |
| B | do | 76–80 | do | | | | III + IV |
| C | do | 41–51 | Hexane | C | 73.00 | 73.37 | III + VII |
| | | | | H | 8.46 | 8.73 | |
| | | | | S | 4.65 | 4.51 | |
| D | do | 90–91 | Heptane | C | 72.68 | 72.83 | II + V |
| | | | | H | 9.71 | 9.54 | |
| | | | | S | 4.41 | 4.35 | |
| E | do | 62.5–63 | do | C | 74.02 | 74.38 | II + VI |
| | | | | H | 10.19 | 10.24 | |
| | | | | S | 3.95 | 3.94 | |
| F | do | 61–76 | Purified by chromatography | | | | I + VIII + II |
| G | do | 56–64 | do | | | | I + VIII + III |
| H | do | 79–87 | Heptane | C | 69.71 | 69.64 | III + VIII |
| | | | | H | 8.43 | 8.77 | |
| | | | | S | 5.47 | 5.48 | |
| I | do | 133–137 | do | C | 70.08 | 69.88 | III + IX |
| | | | | H | 8.57 | 8.55 | |
| | | | | S | 5.35 | 5.35 | |
| J | do | 78–82 | do | C | 70.44 | 70.36 | II + X |
| | | | | H | 8.70 | 8.65 | |
| | | | | S | 5.22 | 5.19 | |
| K | do | 68–72 | Hexane | C | 70.77 | 70.90 | III + X |
| | | | | H | 8.83 | 9.14 | |
| | | | | S | 5.11 | 5.21 | |
| L | do | 74–84 | Purified by chromatography | C | 68.77 | 69.29 | II + XI |
| | | | | H | 8.32 | 7.67 | |
| | | | | S | 5.40 | 5.33 | |
| M | do | 74–84 | do | | | | II + XII |
| N | do | 70–80 | Heptane | | | | III + XII |

The products set out in the above Table I are identified as follows:

| Product | Structural formula | Name of product |
|---|---|---|
| A | $C_8H_{17}S\,CHCOOR_0$<br>$\hspace{2em}|$<br>$\hspace{1em}CH_2COOR_0$ | Bis(3,5-di-tert-butyl-4-hydroxyphenyl-2-(n-octylthio)succinate. |
| B | $C_8H_{17}S\,CH_2CHCOOR_0$<br>$\hspace{4em}|$<br>$\hspace{3em}CH_2COOR_0$ | Bis(3,5-di-tert-butyl-4-hydroxyphenyl)-2-(n-octylthiomethyl) succinate. |
| C | $C_6H_5(CH_2)_3S\,CH_2CHCOOR_0$<br>$\hspace{6em}|$<br>$\hspace{5em}CH_2COOR_0$ | Bis(3,5-di-tert-butyl-4-hydroxyphenyl)-2-(3-phenyl-n-propylthiomethyl)-succinate. |
| D | $C_{12}H_{25}S\,CHCOOR_0$<br>$\hspace{3em}|$<br>$\hspace{2em}CH_2COOR_0$ | Bis(3,5-di-tert-butyl-4-hydroxyphenyl) 2-(n-dodecylthio)-succinate. |
| E | $C_{18}H_{37}S\,CHCOOR_0$<br>$\hspace{3em}|$<br>$\hspace{2em}CH_2COOR_0$ | Bis(3,5-di-tert-butyl-4-hydroxyphenyl) 2-(n-octadecylthio)-succinate. |
| F | $R_0OCOCH_2CH_2S\,CH_2CH_2S\,CHCOOR_0$<br>$\hspace{10em}|$<br>$\hspace{9em}CH_2COOR_0$ | Bis(3,5-di-tert-butyl-4-hydroxyphenyl) 2-(3,5-di-tert-butyl-4-hydroxyphenoxycarbonylethylthioethylthio)succinate. |
| G | $R_0OCOCH_2CH_2S\,CH_2CH_2S\,CH_2CHCOOR_0$<br>$\hspace{12em}|$<br>$\hspace{11em}CH_2COOR_0$ | Bis(3,5-di-tert-butyl-4-hydroxyphenyl) 2-(3,3-di-tert-butyl-4-hydroxyphenoxycarbonylethylthioethylthiomethyl) succinate. |
| H | $\left[\begin{array}{l}R_0OCOCHCH_2S\,CH_2\text{—}\\ \hspace{2em}|\\ R_0OCOCH_2\end{array}\right]_2$ | Tetrakis(3,5-di-tert-butyl-4-hydroxyphenyl) 2,2'-(ethylene-bisthio)disuccinate. |
| I | $\left[\begin{array}{l}R_0OCOCHCH_2S\,CH_2CH_2\text{—}\\ \hspace{2em}|\\ R_0OCOCH_2\end{array}\right]_2$ | Tetrakis(3,5-di-tert-butyl-4-hydroxyphenyl) 2,2'-[tetramethylene-bis(thiomethyl)]disuccinate. |
| J | $\left[\begin{array}{l}R_0OCOCHS(CH_2)_4\text{—}\\ \hspace{2em}|\\ R_0OCOCH_2\end{array}\right]_2$ | Tetrakis(3,5-di-tert-butyl-4-hydroxyphenyl) 2,2'-(octamethylenebisthio)disuccinate. |
| K | $\left[\begin{array}{l}R_0OCOCHCH_2S(CH_2)_4\text{—}\\ \hspace{2em}|\\ R_0OCOCH_2\end{array}\right]_2$ | Tetrakis(3,5-di-tert-butyl-4-hydroxyphenyl) 2,2'-[octamethylene-bis(thiomethyl)]disuccinate. |
| L | $\left[\begin{array}{l}R_0OCOCHS\,CH_2CH_2\text{—}\\ \hspace{2em}|\\ R_0OCOCH_2\end{array}\right]_2\text{—O—}$ | Tetrakis(3,5-di-tert-butyl-4-hydroxyphenyl) 2,2'-[oxybis-(ethylthio)]disuccinate. |
| M | $\left[\begin{array}{l}R_0OCOCHS\,CH_2CH_2\text{—}\\ \hspace{2em}|\\ R_0OCOCH_2\end{array}\right]_2\text{—S—}$ | Tetrakis(3,5-di-tert-butyl-4-hydroxyphenyl) 2,2'-[thiobis-(ethylthio)]disuccinate. |
| N | $\left[\begin{array}{l}R_0OCOCHCH_2S\,CH_2CH_2\text{—}\\ \hspace{2em}|\\ R_0OCOCH_2\end{array}\right]_2\text{—S—}$ | Tetrakis(3,5-di-tert-butyl-4-hydroxyphenyl) 2,2'-[thiobis-(ethylthiomethyl)]disuccinate. |